(12) United States Patent
Atmur et al.

(10) Patent No.: US 10,975,947 B2
(45) Date of Patent: Apr. 13, 2021

(54) OPTIMIZED HARMONIC DRIVE

(71) Applicant: The Boeing Company, Chicago, IL (US)

(72) Inventors: Robert J. Atmur, Whittier, CA (US); William Patrick Sargent, Fullerton, CA (US)

(73) Assignee: THE BOEING COMPANY, Chicago, IL (US)

( * ) Notice: Subject to any disclaimer, the term of this patent is extended or adjusted under 35 U.S.C. 154(b) by 523 days.

(21) Appl. No.: 15/907,281

(22) Filed: Feb. 27, 2018

(65) Prior Publication Data

US 2019/0264791 A1 Aug. 29, 2019

(51) Int. Cl.
| | |
|---|---|
| *F16H 1/32* | (2006.01) |
| *F16H 49/00* | (2006.01) |
| *F16H 55/08* | (2006.01) |
| *F16H 55/17* | (2006.01) |

(52) U.S. Cl.
CPC ....... *F16H 49/001* (2013.01); *F16H 55/0833* (2013.01); *F16H 55/17* (2013.01); *F16H 55/08* (2013.01); *F16H 2049/003* (2013.01); *F16H 2055/176* (2013.01)

(58) Field of Classification Search
CPC .... F16H 49/001; F16H 49/55; F16H 49/0833; F16H 2049/003
USPC .......................................................... 74/640
See application file for complete search history.

(56) References Cited

U.S. PATENT DOCUMENTS

| | | | |
|---|---|---|---|
| 3,667,320 A | 6/1972 | Robinson | |
| 3,996,816 A | 12/1976 | Brighton | |
| 4,776,708 A * | 10/1988 | Carlson | F16H 49/001 384/447 |
| 4,974,470 A * | 12/1990 | Ishikawa | F16H 49/001 74/640 |
| 6,467,375 B1 * | 10/2002 | Ishikawa | F16H 55/0833 74/461 |
| 2007/0266819 A1 | 11/2007 | Ishikawa et al. | |
| 2013/0081496 A1 | 4/2013 | Ishikawa et al. | |
| 2017/0002913 A1 * | 1/2017 | Liang | F16H 25/00 |

FOREIGN PATENT DOCUMENTS

| | | |
|---|---|---|
| EP | 0767325 A3 | 5/1998 |
| EP | 0978667 A3 | 1/2001 |
| JP | H01295051 A | 11/1989 |

OTHER PUBLICATIONS

Extended European Search Report dated Aug. 12, 2019 received in corresponding Application No. 19153486.6, 12 pgs.

* cited by examiner

*Primary Examiner* — William C Joyce

(74) *Attorney, Agent, or Firm* — Moore IP Law

(57) ABSTRACT

An optimized harmonic drive ("OHD") includes a wave generator, a flex spline, and a circular rigid spline. The wave generator includes a wave generator contour that minimizes a velocity profile of the wave generator during a high load condition. The flex spline is attached to the wave generator and the circular rigid spline is mechanically engaged to the flex spline. The flex spline includes a plurality of flex spline teeth and the circular rigid spline includes a plurality of rigid spline teeth. The plurality of rigid spline teeth is greater than the plurality of flex spline teeth and the high load condition exists when the rigid spline teeth of the plurality of rigid spline teeth are fully engaged with flex spline teeth of the plurality of flex spline teeth.

20 Claims, 9 Drawing Sheets

OPTIMIZED HARMONIC DRIVE

BACKGROUND

1. Field

The present disclosure relates to harmonic drives, and in particularly relates to designing tooth profiles for harmonic drives.

2. Related Art

Harmonic drives are utilized throughout different industries and offer good performance in many categories. In general, harmonic drives are commonly known as devices that are utilized for gear reduction, increasing rotational speed, and differential gearing. Harmonic drives are also known as harmonic or strain wave gears systems and include three basic components that includes a wave generator, a flex spline, and a circular rigid spline. Generally, the wave generator consists of two separate parts that include an elliptical disk and an outer bearing where the elliptical disk is inserted into the outer bearing to produce a bearing with an elliptical shape.

The flex spine is a ring or cup that generally has sides that are thin with teeth positioned radially around the outside of the flex spline. The flex spline fits tightly over the wave generator, so that when the wave generator plug is rotated, the flex spline deforms to the shape of a rotating ellipse and does not slip over the outer elliptical ring of the bearing. The bearing lets the flex spine rotate independently to the wave generator's shaft. The circular spline is a rigid circular ring with teeth on the inside. The flex spline and wave generator are placed inside the circular spline, meshing the teeth of the flex spline and the circular spline. Because the flex spline is deformed into an elliptical shape, the teeth of the flex spline only actually mesh with the teeth of the circular spline in two regions on opposite sides of the flex spline located on the major axis of the ellipse. If the input rotation is produced by the wave generator, as the wave generator plug rotates, the flex spline teeth, which are meshed with the teeth of the circular spline, slowly change position. The major axis of the ellipse of the flex spline rotates with the wave generator, so the points where the teeth mesh revolve around the center point at the same rate as the shaft of the wave generator.

In the design of harmonic drives, there are fewer teeth (e.g., two fewer) on the flex spline than there are on the circular spline. As a result, for every full rotation of the wave generator, the flex spline will rotate a slight amount backward relative to the circular spline (e.g., two teeth in this example). Thus the rotation action of the wave generator results in a much slower rotation of the flex spline in the opposite direction.

As a result, harmonic drives have: no backlash; high compactness and light weight; high gear ratios; reconfigurable ratios within a standard housing; good resolution and repeatability when repositioning inertial loads; high torque capability; possible high gear reduction ratios; and coaxial input and output shafts. However, harmonic drives often suffer from reduced efficiency that may be low as 80%, which is below the more typical 93% efficiency of standard non-harmonic drive gearing.

In FIG. 1, a system diagram of an example of an implementation of a known harmonic drive 100 is shown. The harmonic drive 100 includes a wave generator 102, flex spline 104, and circular rigid spline 106. In this example, the wave generator 102 includes a wave generator plug 108 to couple the wave generator 102 to a drive shaft (not shown) and an outer bearing 110 that is an elliptical disk. The flex spline 104 includes a plurality of teeth 112 and the circular rigid spline 106 also includes a plurality of teeth 114, where the plurality of teeth 112 of the flex spline and plurality of teeth 114 of the circular rigid spline 106 are configured to mechanically interface with each other. Moreover, in this example, a zoomed in view 116 is also shown of an example profile of a tooth 118 of the teeth 112 of the flex spline 104 interfacing with a profile of a tooth 120 of the teeth 114 of the circular rigid spine 106.

In general, much of the loss in efficiency is attributed to friction between the teeth during the meshing process. Known approaches to improve this efficiency by optimizing the tooth shape have been extensively researched with mixed results. Moreover, known harmonic drives (such as harmonic drive 100) have a movement locus of the teeth of the harmonic drive 100 that corresponds to a prolate trochoid motion that has points within the movement locus that change in direction.

FIG. 2 shows a system diagram of a zoomed in view 200, which is similar to zoomed in view 116 shown in FIG. 1. The view 200 includes a plot of the movement locus 202 of a tooth 204 of teeth 112 of the flex spline 104 in relation to a first tooth 206 and a second tooth 208 of teeth 114 of the circular rigid spline 106. In between the first tooth 206 and the second tooth 208 of teeth 114 of the circular rigid spline 106 is a tooth cavity 210 that is configured to receive the tooth 204. In this example, the tooth 204 has a first center position 212 and the tooth cavity 210 has a second center position 214. In this example, the movement locus 202 is obtained when the relative movement 216 of the two gears (i.e., the flex spline 104 and circular rigid spline 106) of the harmonic drive 100 is approximated by a rack. The movement locus 202 is obtained in a principal cross section (i.e., the cross section perpendicular to an axis 218 and selected at a given position of the tooth 204 in the tooth trace direction shown by relative movement 216), which generally constitutes a basis for forming the tooth profiles of the two gears—the flex spline 104 and circular rigid spline 106. In general, the resulting plot of the movement locus 202 is a prolate trochoid motion curve that corresponds to a curve traced by a point extending from the rim of a circular wheel as the wheel rolls along a straight line without slipping where the curve includes loops 220, 222, and 224.

FIG. 3A shows a graph 300 of a plot of a velocity profile 302 of the harmonic drive 100 versus the position of the tooth 204 along a horizontal axis 304 as a result of the prolate trochoid motion along the movement locus of FIG. 2. In this example, the velocity of tooth 204 starts at zero (or approximately zero) at point 306 and increases rapidly along the velocity profile 302 plot until a maximum velocity is reached at a point 308 (along the velocity profile 302) that corresponds to the first center position 212 of tooth 204 reaching the second center position 214 within the tooth cavity 210 while traveling along the plot of the movement locus 202. As such, at point 308, the tooth 204 reaches full engagement with the first tooth 206 and second tooth 208 within the tooth cavity 210. Since the tooth 204 is fully engaged with the first tooth 206 and second tooth 208, this results in a high load condition between the flex spline 104 and circular rigid spline 106. However, since this motion is a prolate trochoid motion that includes at least loop 222, the movement of the tooth 204 relative to the first tooth 206 and second tooth 208 causes an immediate change in direction at point 310 and causes immediate travel at high velocity in the opposite direction while rapidly reducing velocity until reaching a point 312 where the velocity of the velocity profile 302 is about zero. A resulting efficiency from this movement locus 202 is shown in FIG. 3B.

FIG. 3B shows a graph 314 of a plot of a load multiplied by a velocity 316. The area 318 under the plot of the load multiplied by velocity 316 represents the frictional loss that is proportional to the efficiency of the harmonic drive 100 based on the movement locus 202.

Unfortunately, as a result of these issues, at present the best efficiencies for harmonic drives are approximately 90% and these high efficiencies are difficult to achieve consistently because of typical manufacturing variances. As such, there is a need for a method of producing harmonic drives that are more efficient than harmonic drives made using existing approaches.

SUMMARY

Disclosed is an optimized harmonic drive ("OHD"). The OHD includes a wave generator, a flex spline, and a circular rigid spline. The wave generator includes a wave generator contour that minimizes a velocity profile of the wave generator during a high load condition. The flex spline is attached to the wave generator and the circular rigid spline is mechanically engaged to the flex spline. The flex spline includes a plurality of flex spline teeth and the circular rigid spline includes a plurality of rigid spline teeth. A number of rigid spline teeth of the plurality of rigid spline teeth is greater than a number of flex spline teeth of the plurality of flex spline teeth and a high load condition exists when the rigid spline teeth of the plurality of rigid spline teeth are fully engaged with flex spline teeth of the plurality of flex spline teeth. A minimized velocity profile may be approximately equal to zero at the high load condition.

Also disclosed is a method for producing the OHD. The method includes determining a wave generator contour such that the wave generator contour minimizes a velocity profile of the wave generator during a high load condition. The method may also include determining a flex tooth contour that matches the wave generator contour, where each flex spline tooth of the plurality of flex spline teeth has a flex tooth contour that matches the wave generator contour and the flex tooth contour also minimizes the velocity profile for a combination of the wave generator and the plurality of flex spline teeth during the high load condition. The method may further include determining a rigid tooth contour that matches the wave generator contour, where each rigid spline tooth of the plurality of rigid spline teeth has the rigid tooth contour that matches the wave generator contour and the rigid tooth contour also minimizes the velocity profile of a combination of the wave generator, plurality of flex spline teeth, and the plurality of rigid spline teeth during the high load condition.

Other devices, apparatus, systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

An optimized harmonic drive ("OHD") is disclosed. The OHD includes a wave generator, a flex spline, and a circular rigid spline. The wave generator includes a wave generator contour that minimizes a velocity profile of the wave generator during a high load condition. The flex spline is attached to the wave generator and the circular rigid spline is mechanically engaged to the flex spline. The flex spline includes a plurality of flex spline teeth and the circular rigid spline includes a plurality of rigid spline teeth. A number of rigid spline teeth of the plurality of rigid spline teeth is greater than a number of flex spline teeth of the plurality of flex spline teeth and a high load condition exists when the rigid spline teeth of the plurality of rigid spline teeth are fully engaged with flex spline teeth of the plurality of flex spline teeth. The minimized velocity profile may be approximately equal to zero at the high load condition.

Also disclosed is a method for producing the OHD. The method includes determining the wave generator contour such that the wave generator contour minimizes the velocity profile of the wave generator during a high load condition.

The method may also include determining a flex tooth contour that matches the wave generator contour, where each flex spline tooth of the plurality of flex spline teeth has a flex tooth contour that matches the wave generator contour and the flex tooth contour also minimizes the velocity profile a combination of the wave generator and the plurality of flex spline teeth during the high load condition. The method may further include determining a rigid tooth contour that matches the wave generator contour, where each rigid spline tooth of the plurality of rigid spline teeth has the rigid tooth contour that matches the wave generator contour and the rigid tooth contour also minimizes the velocity profile of a combination of the wave generator, plurality of flex spline teeth, and the plurality of rigid spline teeth during the high load condition.

Figure 4:
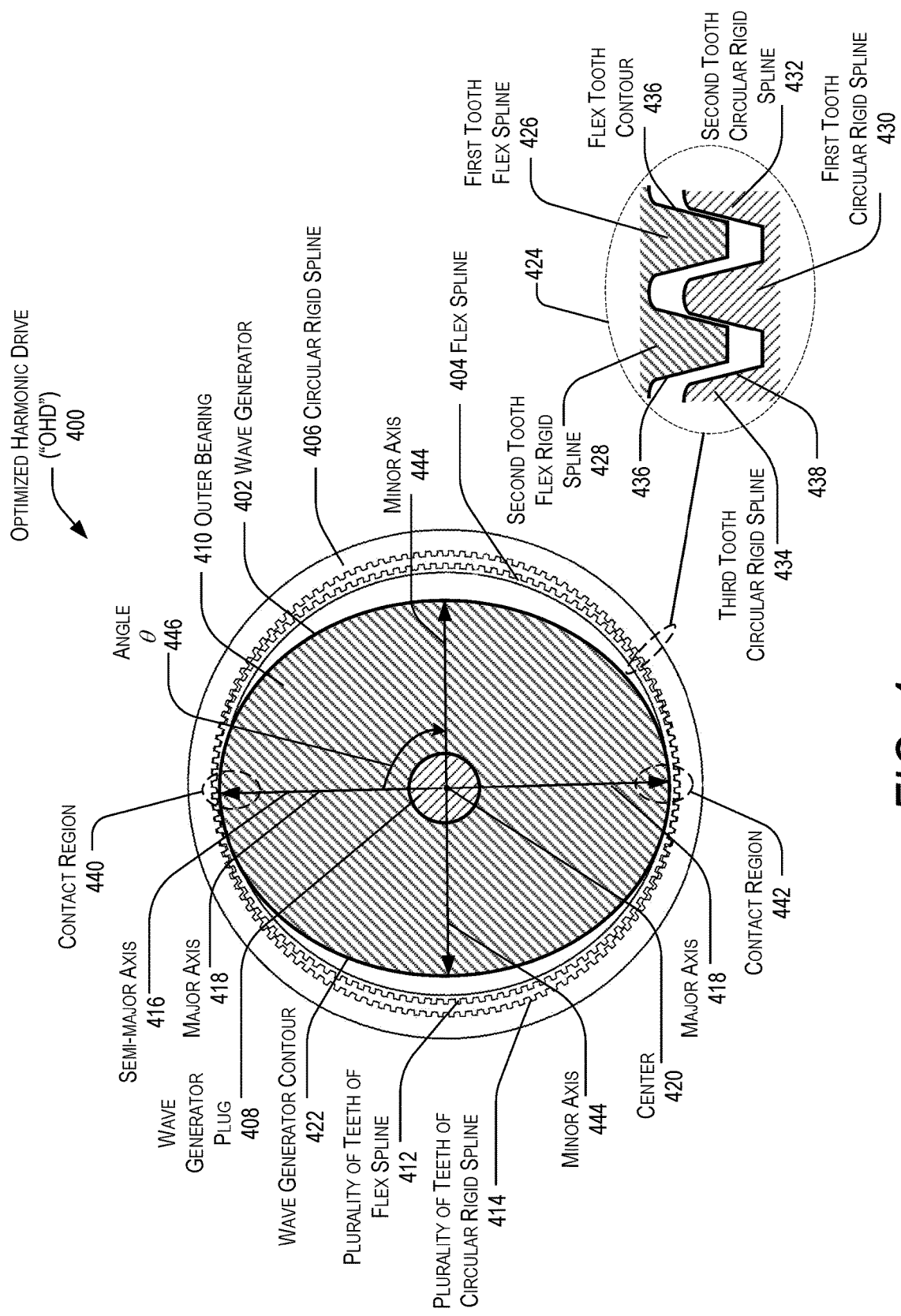
FIG. 4 is a system diagram of an example of an implementation of an optimized harmonic drive ("OHD") in accordance with the present disclosure.

In FIG. 4, an example of an implementation of an OHD 400 is shown in accordance with the present disclosure. The OHD 400 includes a wave generator 402, flex spline 404, and circular rigid spline 406. In this example, the wave generator 402 includes a wave generator plug 408 to couple the wave generator 402 to a drive shaft (not shown) and an outer bearing 410 that is an elliptical disk. The flex spline 404 includes a plurality of teeth 412 and the circular rigid spline 406 also includes a plurality of teeth 414, where the plurality of teeth 412 of the flex spline and plurality of teeth 414 of the circular rigid spline 406 are complementary and configured to mechanically interface with each other. In this example, the outer bearing 410 has a semi-major axis 416 (i.e., half of the major axis 418) that extends from a center 420 to a wave generator contour 422 (that is an outer edge) of the outer bearing 410.

Moreover, in this example, a zoomed in view 424 is also shown of an example profile of a first tooth 426 and second tooth 428 of the teeth 412 of the flex spline 404 interfacing with a profile of a first tooth 430, second tooth 432, and third tooth 434 of the teeth 414 of the circular rigid spline 406. In this example, the wave generator 402 also includes the wave generator contour 422 that is the outer edge that corresponds to the circumference of the elliptical shape of wave generator 402. Additionally, each tooth (including first tooth 426 and second tooth 428) of the teeth 412 of the flex spline 404 has a flex tooth contour 436 that matches the wave generator contour 422 and also minimizes a velocity profile of a combination of the wave generator 402 and flex spline 404 during a high load condition. Moreover, each tooth (including first tooth 430, second tooth 432, and third tooth 434) of the teeth 414 of the rigid spline 406 has a rigid tooth contour 438 that matches the wave generator contour 422 and also minimizes the velocity profile of the rigid spline 406 during the high load condition. In this example, it is appreciated by those of ordinary skill in the art that the shape of the teeth 412 and 414 are drawn in general for the purpose of illustration; however, it is appreciated that the actual shape (i.e., contour) of the teeth 412 and 414 will be determined by the shape profile of the flex and rigid tooth contours 436 and 438 as determined by the disclosed method.

In general, the present disclosure allows for the wave generator contour 422, flex tooth contour 436, and rigid tooth contour 438 to have curves that have position and velocity profiles that minimize the load at the highest radial engagement rates and maximize loads at the minimum or zero engagement rates. The curves are determined by utilizing a non-linear involute curve generation process described herein.

Many gears utilize involute gear profiles where profiles of the teeth are involutes of a circle (i.e., based on a spiraling curve traced by the end of an imaginary taut string unwinding itself from that stationary circle). Utilizing this approach, the tooth profile of an involute gear depends only on the number of teeth on the gear, pressure angle, and pitch, but not on the gear it mates with. This is based on Euler's relationship of (sin θ−θ cos θ), where θ ranges in value between −90 degrees to 90 degrees. However, this relationship only works for in-plane gearing where the teeth of the gears that are meshing and moving along the same angular direction and rate relative to each other. However, in a harmonic gear, there are two different angular rates where one is the angular rate of the wave generator 402 and the other is the radial rate of the gear interface between the plurality of teeth 412 of the flex spline 404 and plurality of teeth 414 of the circular rigid spline 406.

In this example, the teeth 412 of the flex spline 404 are positioned radially around the outside of the flex spline 404 and the teeth 414 of the circular rigid spline 406 are positioned radially inward from the circular rigid spline 406. The flex spline 404 and wave generator 402 are placed inside the circular rigid spline 406, meshing the teeth 412 of the flex spline 404 with the teeth 414 of the circular rigid spline 406. The flex spline 404 fits tightly over the wave generator contour 422 of the wave generator 402, so that when the wave generator plug 408 is rotated (causing the outer bearing 410 to rotate), the flex spline 404 deforms to the shape of the wave generator contour 422. Since the wave generator contour 422 is elliptically shaped, when the outer bearing 410 rotates, the wave generator contour 422 traces a planar deflection that has the greatest extension along the major axis 418. This results in the teeth 412 of the flex spline 404 having an additional orthogonal motion in relation to the teeth 414 of the circular rigid spline 406 because as the wave generator 402 rotates the teeth 412 of the flex spline 404 only engage and actually mesh with the teeth 414 of the circular rigid spline 406 at two distinct contact regions 440 and 442 along the major axis 418 along opposite sides of the flex spline 404. Once the wave generator 402 rotates past a given set of the teeth 414 of the circular rigid spline 406, the teeth 412 of the flex spline 404 pull away from the teeth 414 of the circular rigid spline 406 to a distance that is greatest along the minor axis 444. In this example, the wave generator 402 rotates along angle θ 446 in a clockwise motion.

Moreover, as the wave generator 402 rotates, the teeth 412 of the flex spline 404 are meshed together with the teeth 414 of the circular rigid spline 406 in a process that includes a rotational angular motion and an orthogonal motion that is perpendicular to the rotational angular motion. The major axis 418 of the ellipse of the flex spline 404 rotates with the wave generator 402 such that the points where the teeth 412 and 414 mesh revolve around the center point 420 at the same rate as the wave generator plug 408. The OHD 400 has fewer teeth 412 (for example two fewer) on the flex spline 404 than there are on the circular rigid spline 406. As such, for every full rotation of the wave generator 402, the flex spline 404 rotates a slight amount (i.e., two teeth) backward relative to the circular rigid spline 406. Thus the rotation action of the wave generator 402 results in a slower rotation of the flex spline 404 in the opposite direction as compared to the direction of rotation of the wave generator 402.

The wave generator contour 422 of the OHD 400 is defined by the semi-major axis 416 that has a parametric relationship with the angle θ 442. The length of semi-major axis 416 is related to $$H(\sin|\theta|-|\theta|\cos\theta)^x$$

where H is the tooth height designed to meet the load, x is greater than 0 and less than 1, and θ 446 is between $-\frac{\pi}{2}$ to $\frac{\pi}{2}$.

This relationship is the involute function (i.e., sin θ−θ cos θ) non-linearly distorted by raising it to a fractional power with x, which is the first term in a series expansion that describes the optimal shape for the wave generator contour 422 but since this optimal shape is an ellipse projecting on a circle there is no closed form equation for the relationship and only good approximations are possible based on a series expansion. In this disclosure, the first term of the series expansion is chosen because, in practice, fabricating and machining the wave generator 402 and the teeth 412 and 414 cannot be done more accurately that the estimate given by the first term of the series expansion. The relationship generates the proper tooth profile for all the teeth 412 and 414 on both the flex spline 404 and circular rigid spline 406. As a result, H becomes the difference between the major axis 418 and minor axis 444 of the wave generator 402.

As such and in general, the wave generator contour 420 of the outer bearing 410 has an elliptical shape with a semi-major axis 416 that has a length that produces a movement locus that has a velocity profile that has a high velocity initially at a starting point and then drops to zero (or approximately zero) when the teeth 412 of flex spline 404 are fully engaged with the teeth 414 of the circular rigid spline 406. This position corresponds to a high load condition. After reaching this position, the movement locus produces a velocity profile that increases from zero to an end position where the velocity is high. The resulting velocity profile then has a high velocity in a first direction that smoothly transitions to a high velocity in a second opposite direction. If the load has a constant value, the plot of the resulting load multiplied by velocity of the velocity profile would result in a plot with a dip corresponding to the transition of the velocity profile from a first maximum velocity in the first direction to the second maximum velocity in the second opposite direction. The lowest point of the dip may be equal to zero (or approximately zero) resulting in much lower frictional losses that correspond to higher efficiency for the OHD 400.

As an example, if it is desired to design an OHD 400 with a six (6) inch diameter that has 200 teeth 412 on the flex spline 404 and 202 teeth 414 on the circular rigid spline 406, the resulting reduction ratio of the OHD 400 is equal to number of teeth 412 (i.e., 200) minus the number of teeth 414 (i.e., 202) divided by the number of the teeth 412 (i.e., (200−202)/200). The resulting value of the resulting reduction ratio is −0.01 that means that the flex spline 404 spins at 1 percent of the speed of the wave generator 402 and in the opposite direction of the wave generator 402. Moreover, the tooth width is equal to three (3) times π (i.e., 3.14159265 . . . ) divided by the number of teeth 414 (i.e., 202) that equals 0.0466 inches. At this width, a tall tooth is not desirable due to potential bending caused by the meshing of the teeth 412 of the flex spline 404 and the teeth 414 of the circular rigid spline 406. As such, the tooth height (i.e., H) should be set to approximately no taller than 0.045 inch, which would set the parameters for both the tooth and wave generator 402. In this example, the tooth height of 0.045 inches is for both the teeth 412 of the flex spline 404 and the teeth 414 of the circular rigid spline 406.

In other words, in the example, the plurality of rigid spline teeth is greater than the plurality of flex spline teeth, the plurality of rigid spline teeth has a first number of teeth, and the plurality of flex spline teeth has a second number of teeth. A teeth difference is equal to the second number of teeth minus the first number of teeth and the reduction ratio is equal to the teeth difference divided by the first number of teeth. Moreover, a tooth width is equal to a half of a circumference of the circular rigid spline divided by the first number of teeth and H is approximately equal to and less than the tooth width.

In order to determine the wave generator contour 422, a parametric radius ("$R_m$") of the wave generator 402 is determined based on the major axis 418 and height of the tooth H. As discussed earlier, the wave generator contour 422 of the OHD 400 is defined by the semi-major axis 416 that has a parametric relationship with the angle θ 442. The length of semi-major axis 416 is defined as equal to the relationship (herein referred to as relationship 1)

$$H(\sin|\theta|-|\theta|\cos\theta)^x,$$

where H is the tooth height designed to meet the load, x is greater than 0 and less than 1, and θ 446 is between $-\frac{\pi}{2}$ to $\frac{\pi}{2}$.

In this example, the height of the tooth H is equal to 0.045 inches and the diameter of the OHD 400 is equal to 6 inches. As such, the parametric radius $R_m$ of the wave generator is equal to $$R_m = (\text{semi-major axis}) - H(\sin|\theta|-|\theta|\cos\theta)^x.$$

Inserting the values for H and the semi-major axis 418, the relationship becomes $$R_m = \frac{6 \text{ inches}}{2} - (0.45 \text{ inches})(\sin|\theta| - |\theta|\cos\theta)^x,$$

where x is greater than 0 and less than 1, and θ 446 is between $-\frac{\pi}{2}$ to $\frac{\pi}{2}$.

Figure 5A:
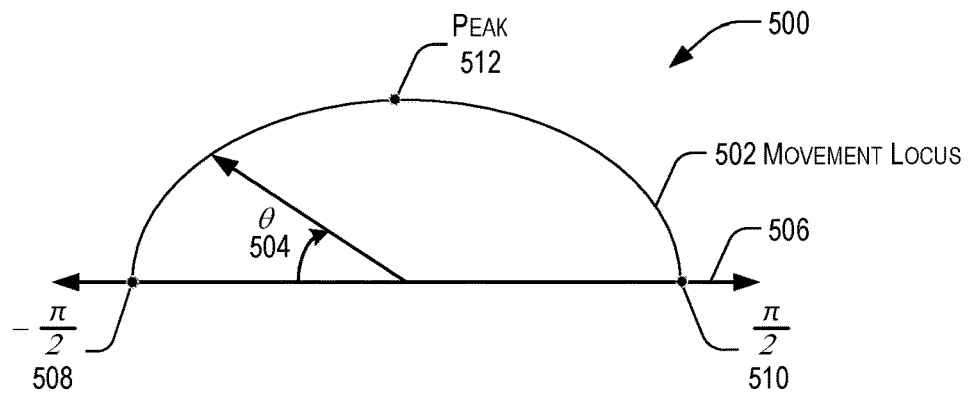
FIG. 5A is a graph of a plot of an example of an implementation of a movement locus of a first tooth of teeth of a flex spline in relation to a first and second tooth of teeth of a circular rigid spline in accordance with the present disclosure.

Turning to FIG. 5A, a graph 500 is shown of a plot of a movement locus 502 of the first tooth 426 of teeth 412 of the flex spline 404 in relation to the first tooth 430 and second tooth 432 of teeth 414 of the circular rigid spline 406 in accordance with the present disclosure. In this graph 500, the plot of the movement locus 502 of the first tooth 426 travels angularly at an angle θ 504 along a horizontal axis 506 over 180 degrees (i.e., π radians) from a start point of −90 degrees 508 (i.e., minus π/2) to an end point of 90 degrees (i.e., π/2) 510. From the plot of the movement locus 502 it is appreciated by those of ordinary skill in the art that the velocity of the movement of first tooth 426 in relation to the teeth 414 of the circular rigid spline 406 is high at the start point 508 and end point 510 and approximately zero at a peak point 512.

Figure 1:
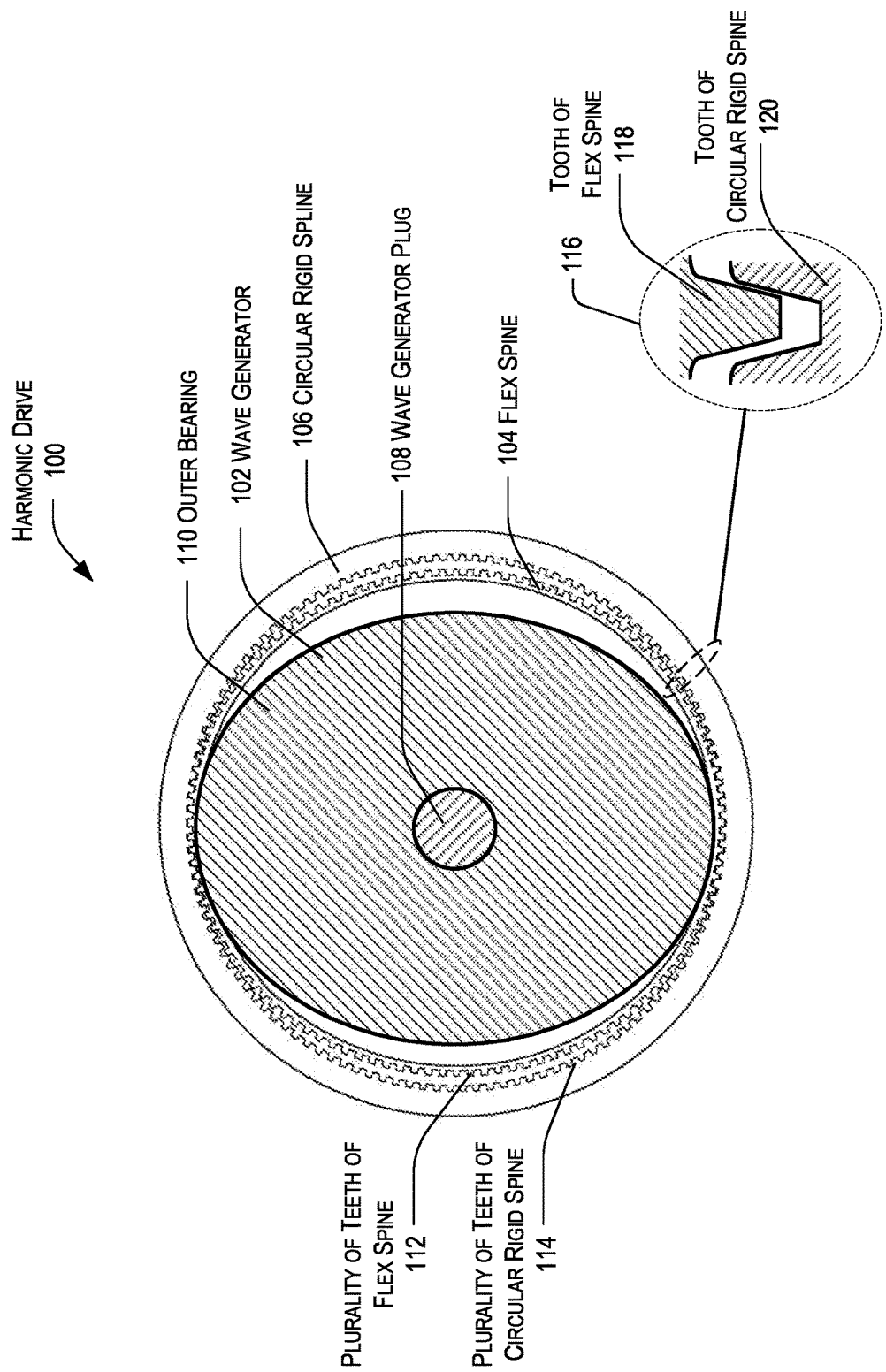
FIG. 1 is a system diagram of an example of an implementation of a known harmonic drive.
Figure 2:
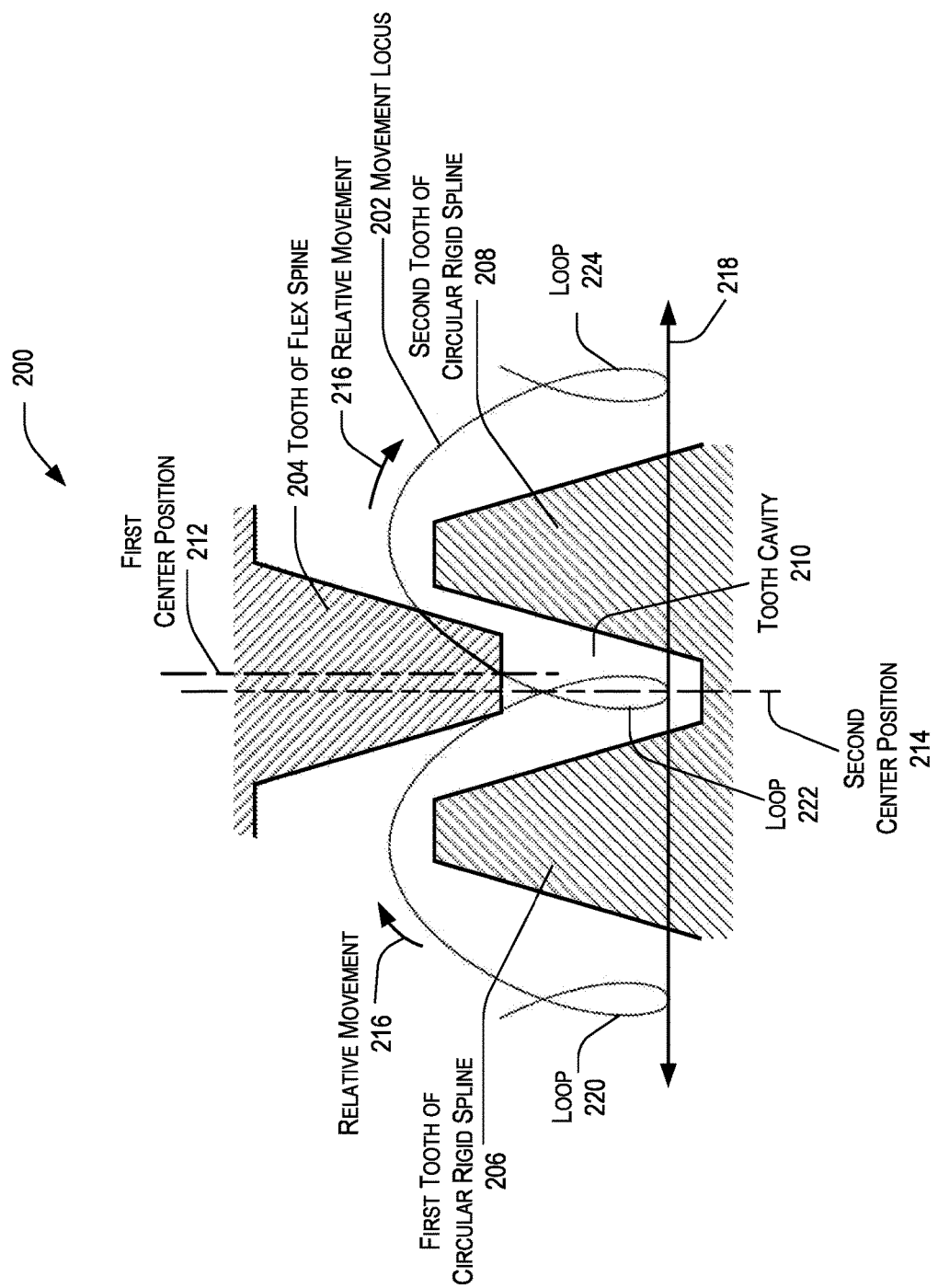
FIG. 2 is a system diagram of an example of an implementation of the zoomed in view of the harmonic drive shown in FIG. 1.
Figure 3A:
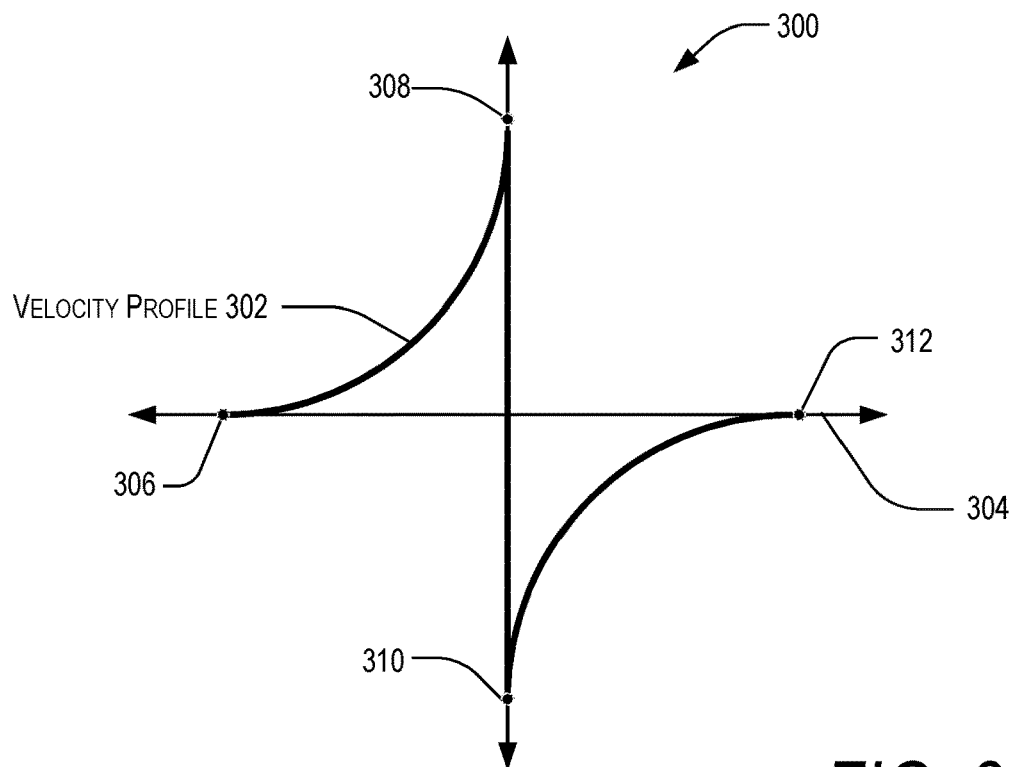
FIG. 3A is a graph of a plot of a velocity profile of the harmonic drive shown in FIGS. 1 and 2.
Figure 5B:
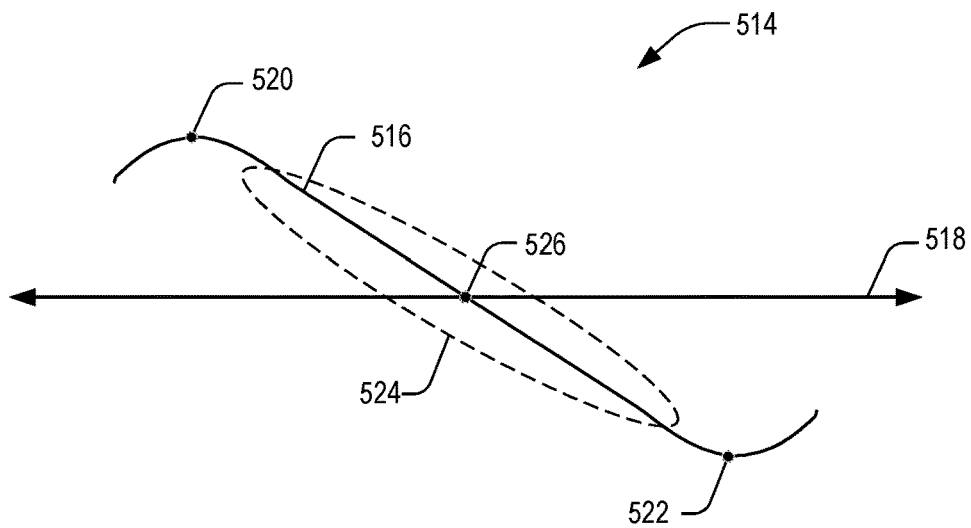
FIG. 5B is a graph of a plot of an example of a velocity profile of the first tooth along a horizontal axis corresponding to the plot of the movement locus (shown in FIG. 5A) in accordance with the present disclosure.

In FIG. 5B, a corresponding graph 514 is shown of a plot of velocity profile 516 of the first tooth 426 along a horizontal axis 518 corresponding to the plot of the movement locus 502 shown in FIG. 5A in accordance with the present disclosure. In this example, it is seen that the velocity is maximum, at point 520, in a forward direction (i.e., positive maximum) at the start point 508 and maximum, at point 522, in the reverse direction (i.e., negative maximum) at the end point 510. Unlike the velocity profile of known harmonic drives (shown as velocity profile 302 in FIG. 3A), the velocity transition 524 from maximum velocity, at point 520, in a forward direction and maximum velocity, at point 522, in a reverse direction is not very steep and more gently passes through velocity zero, at point 526, that corresponds to peak load condition where there is full engagement between the teeth 412 of flex spline 404 and the teeth 414 of rigid spline 406.

Figure 3B:
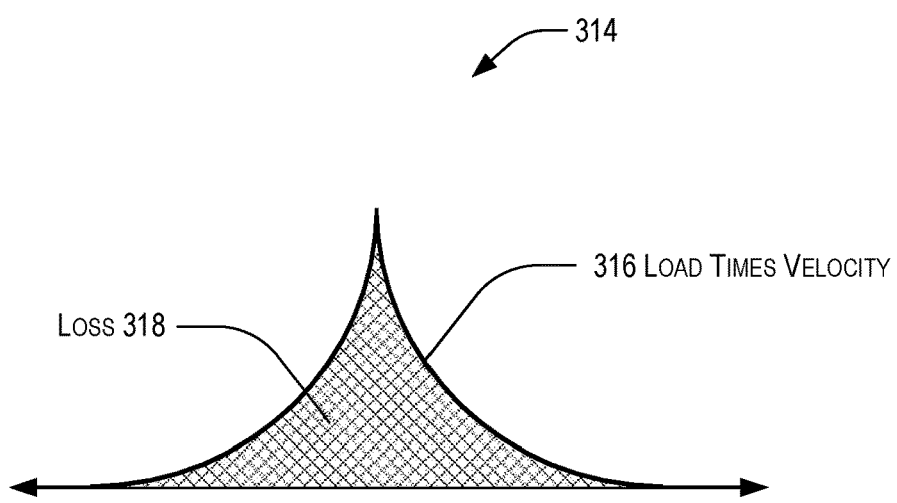
FIG. 3B is a graph of a plot of a load multiplied by a velocity where the area under the plot of the load multiplied by velocity represents the frictional loss that is proportional to the efficiency of harmonic drive shown in FIGS. 1 and 2.
Figure 5C:
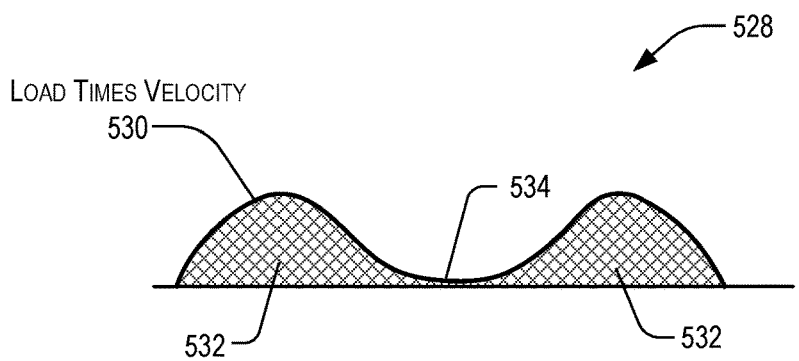
FIG. 5C is a graph of a plot of an example of an implementation of a load multiplied by a velocity where the area under the plot of the load multiplied by velocity represents the frictional loss that is proportional to the efficiency of harmonic drive in accordance with the present disclosure.

FIG. 5C is a graph 528 of a plot of the load multiplied by velocity 530 where the area 532 under the plot of the load multiplied by velocity 530 represents the frictional loss that is proportional to the efficiency of the OHD 400 in accordance with the present disclosure. Unlike, the graph 304 of known harmonic drives 100 (shown in FIG. 3B), since the present graph 528 shows that the velocity zero, a point 526, is at peak load condition, the plot of the load multiplied by velocity 530 has a dip 534 that is approximately zero where the velocity profile is at velocity zero or approximately zero, at point 526. This means that the frictional losses (i.e., area 532) are much smaller than the frictional losses of known harmonic drives 100 (as shown in area 308 of FIG. 3B) and, therefore, the efficiency of the OHD 400 is higher than the efficiency of the harmonic drive 100.

Figure 6:
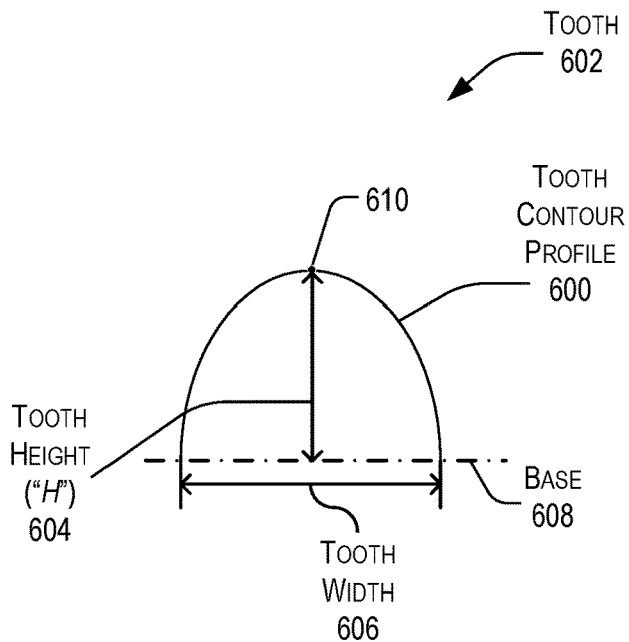
FIG. 6 is side view of an example of an implementation of a tooth contour profile of a tooth in accordance with the present disclosure.

FIG. 6 is a tooth contour profile 600 of a tooth 602 in accordance with the present disclosure. In this example, the tooth 602 includes a tooth height (i.e., H) 604 and a tooth width 606. The tooth height 604 extends from a base 608 of the tooth 602 to a height point 610 of the tooth 602 that is the height portion of the tooth 602. When designing the tooth contour profile 600, the tooth height 604 is subtracted from an initially circular wave generator to project that reduction in a way that produces a wave function that will correctly control the meshing velocity of the teeth 412 and 414 which will optimize that shape profile (i.e., the wave generator contour 422 and the tooth contour profile 600 of both the teeth 412 and 414) to minimize the speed under load. Each tooth of the teeth 412 and 414 is fabricated to the same tooth height (i.e., H) 604 and tooth width 606 but the tooth width 606 is controlled by the diameter of circular rigid spline 406. As discussed earlier as an example, the tooth width 606 is determined by dividing half (i.e., ½) the circumference of the circular rigid spline 406 by the number of teeth needed for a designed gear ratio.

This provides the total tooth width 606 of each tooth (such as tooth 602). The tooth width 606 is linearly divided in $\pi$ segments and used to form the base width ("B") of the tooth 602. Using relationship 1 (as described earlier) to create the tooth contour profile 600, the tooth width 606 associated with each tooth height 604 is B determined from the angles 0 to $\pi$ radians. In other words, the tooth contour profile 600 is defined by the relationship $$B\left(\theta + \frac{\pi}{2}\right),$$

where the angle $\theta$ varies from $$-\frac{\pi}{2} \text{ to } \frac{\pi}{2}.$$

This is the "horizontal" position for each tooth height 604 determined by relationship 1. As a result, the tooth height 604 becomes the difference between the major axis 418 and minor axis 444 of the wave generator 402.

Figure 7:
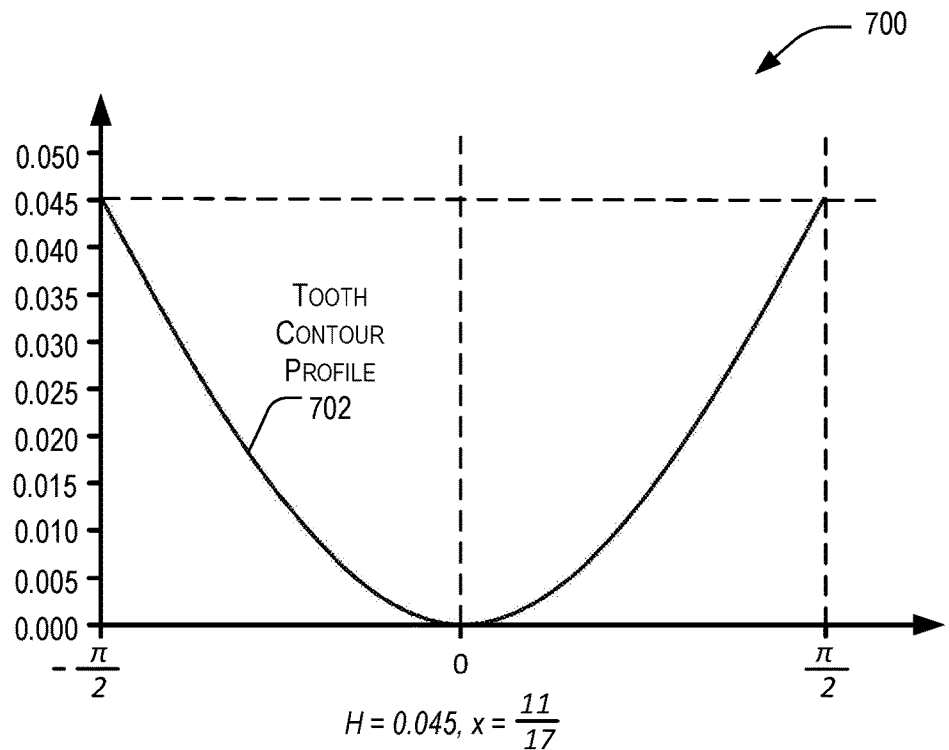
FIG. 7 is a graph of a plot of an example of an implementation of tooth contour profile in accordance with the present disclosure.

Turning to FIG. 7, a graph 700 of a plot of an example of an implementation of tooth contour profile 702 is shown in accordance with the present disclosure. In this example, the tooth contour profile 702 corresponds to the tooth contour profile 600 shown in FIG. 6 with the example values described earlier of an OHD 400 with a six (6) inch diameter that has 200 teeth 412 on the flex spline 404 and 202 teeth 414 on the circular rigid spline 406. The resulting reduction ratio of the OHD 400 is equal to −0.01 and the tooth wide 606 is equal to 0.0466 inches. The tooth height (i.e., H) 604 is set to 0.045 inches and x is set to approximately $^{11}/_{17}$ (or about 0.6471). The resulting tooth contour profile 702 ranges from 0 to 0.045 for angles $\theta$ from $$-\frac{\pi}{2} \text{ to } \frac{\pi}{2}$$

utilizing $$H(\sin|\theta| - |\theta|\cos\theta)^x,$$

where H is equal to 0.045 and x is equal to $^{11}/_{17}$.

Figure 8:
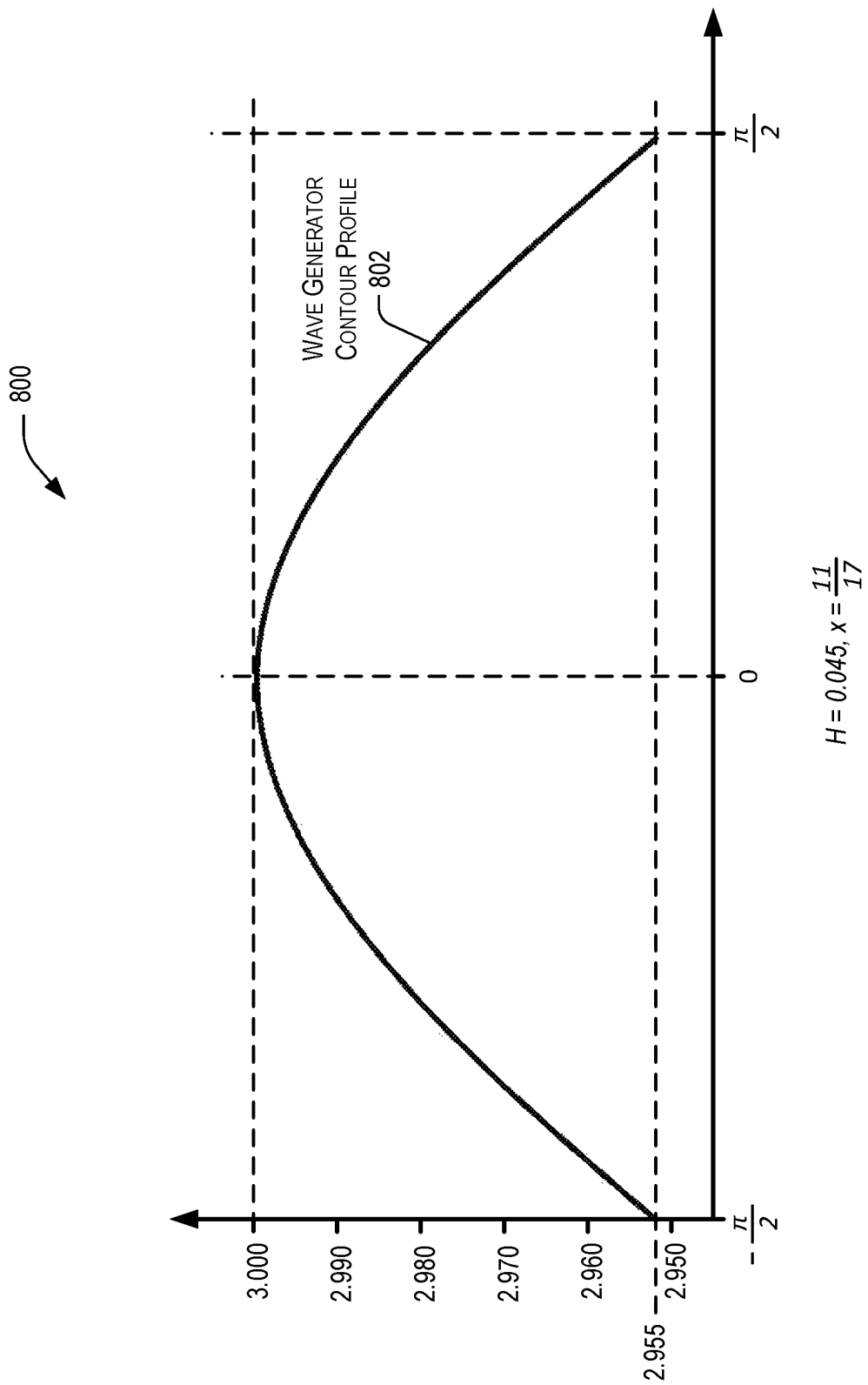
FIG. 8 is a graph of a plot of an example of an implementation of wave generator contour profile in accordance with the present disclosure.

In FIG. 8, a graph 800 of a plot of an example of an implementation of wave generator contour profile 802 is shown in accordance with the present disclosure. In this example, the wave generator contour profile 802 corresponds to the wave generator contour 422 (shown in FIG. 4) with the example values described earlier of an OHD 400 with a six (6) inch diameter that has 200 teeth 412 on the flex spline 404 and 202 teeth 414 on the circular rigid spline 406. The resulting reduction ratio of the OHD 400 is equal to −0.01 and the tooth wide 606 is equal to 0.0466 inches. The tooth height (i.e., H) 604 is set to 0.045 inches and x is set to approximately $^{11}/_{17}$ (or about 0.6471). The resulting wave generator contour profile 802 ranges from 2.955 to 3.00 for angles $\theta$ from $$-\frac{\pi}{2} \text{ to } \frac{\pi}{2}$$

utilizing $$R_M - H(\sin|\theta| - |\theta|\cos\theta)^x,$$

where H is equal to 0.045, $R_M$ is the semi-major axis 416 equal to 3 (i.e., half of the major axis 418 of 6), and x is equal to $^{11}/_{17}$.

Figure 9:
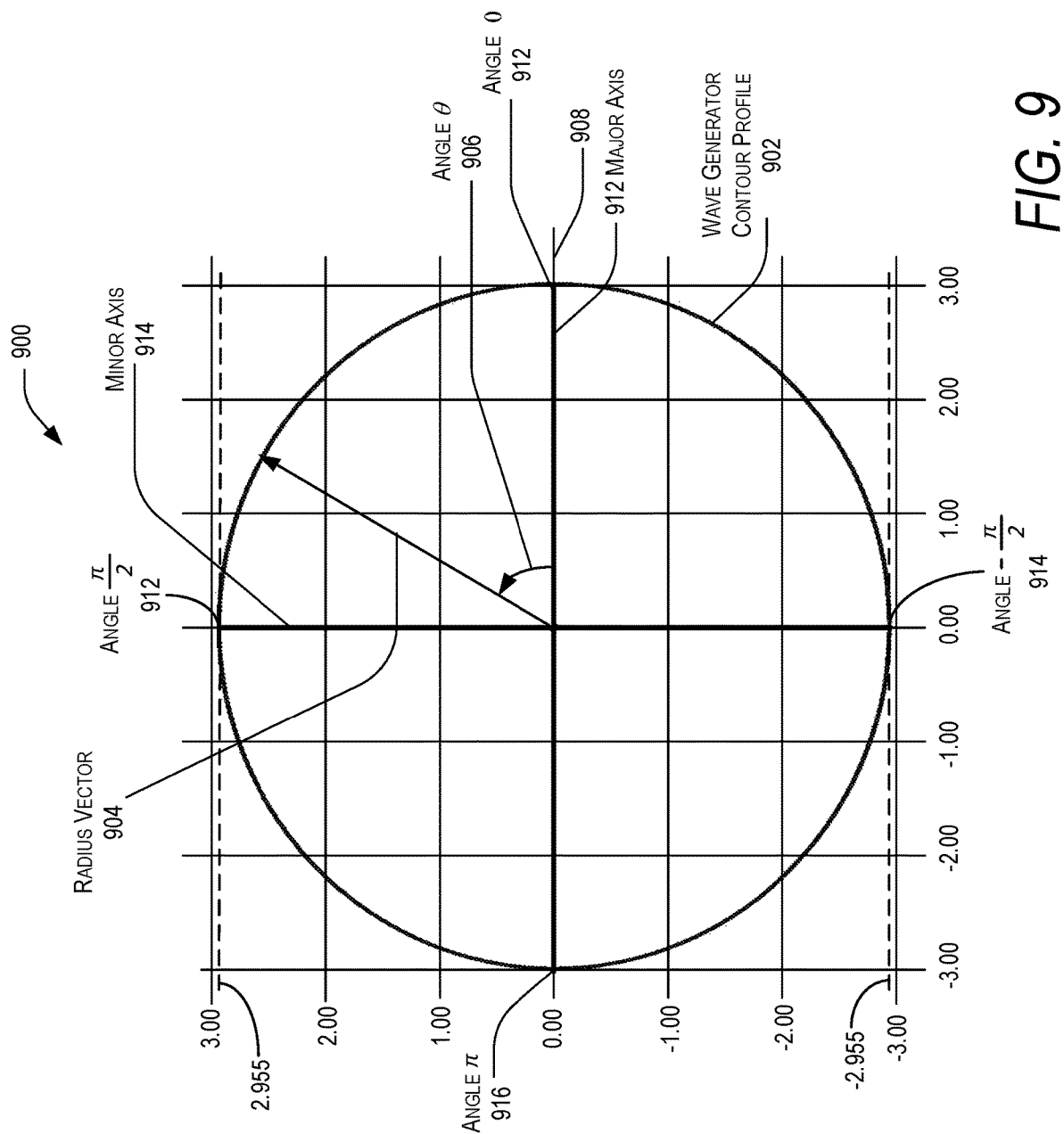
FIG. 9 is a graph of another plot of the implementation of wave generator contour profile (shown in FIG. 8) in accordance with the present disclosure.

Turning to FIG. 9, a graph 900 of another plot of the implementation of wave generator contour profile 902 is shown in accordance with the present disclosure. Similar to the example in FIG. 8 in this example, the wave generator contour profile 902 corresponds to the wave generator contour 422 (shown in FIG. 4) with the example values described earlier of an OHD 400 with a six (6) inch diameter that has 200 teeth 412 on the flex spline 404 and 202 teeth 414 on the circular rigid spline 406. As before, the reduction ratio of the OHD 400 is equal to −0.01, the tooth width 606 is equal to 0.0466 inches, the tooth height 604 is equal to 0.045 inches, x is set to $^{11}/_{17}$, and $R_M$ 416 is equal to 3. The graph 900 has horizontal and vertical axes values that both range from −3.00 to 3.00. Additionally, the graph 900 includes a radius vector 904 that rotates with angle $\theta$ 906 from $-\pi$ to $\pi$ as referenced at the zero axis 908. In this example, the zero axis 908 is at an angle equal to 0 radians 910, a first point 912 is at an angle equal to $$\frac{\pi}{2}$$

radians, a second point 914 is at an angle equal to $$-\frac{\pi}{2}$$

radians, and the opposite point 916 from the zero axis 908 is at an angle equal to π radians (i.e., or alternatively −π radians). In this example, the radius vector 904 rotates with angle θ 906 and traces the wave generator contour profile 902.

Since H is equal to 0.045 inches, the wave generator contour profile 902 is an ellipse that is almost circular. The value of the major axis 912 is 6.00 inches (i.e., from −3.00 to 3.00) and the minor axis 914 is 5.91 inches (i.e., from −2.955 to 2.955), where the difference between the major and minor axes is 0.09 inches (i.e., the difference between the length of the semi-major and the length of the semi-minor axes is 0.045 inches) corresponding to twice the tooth height H.

Figure 10:
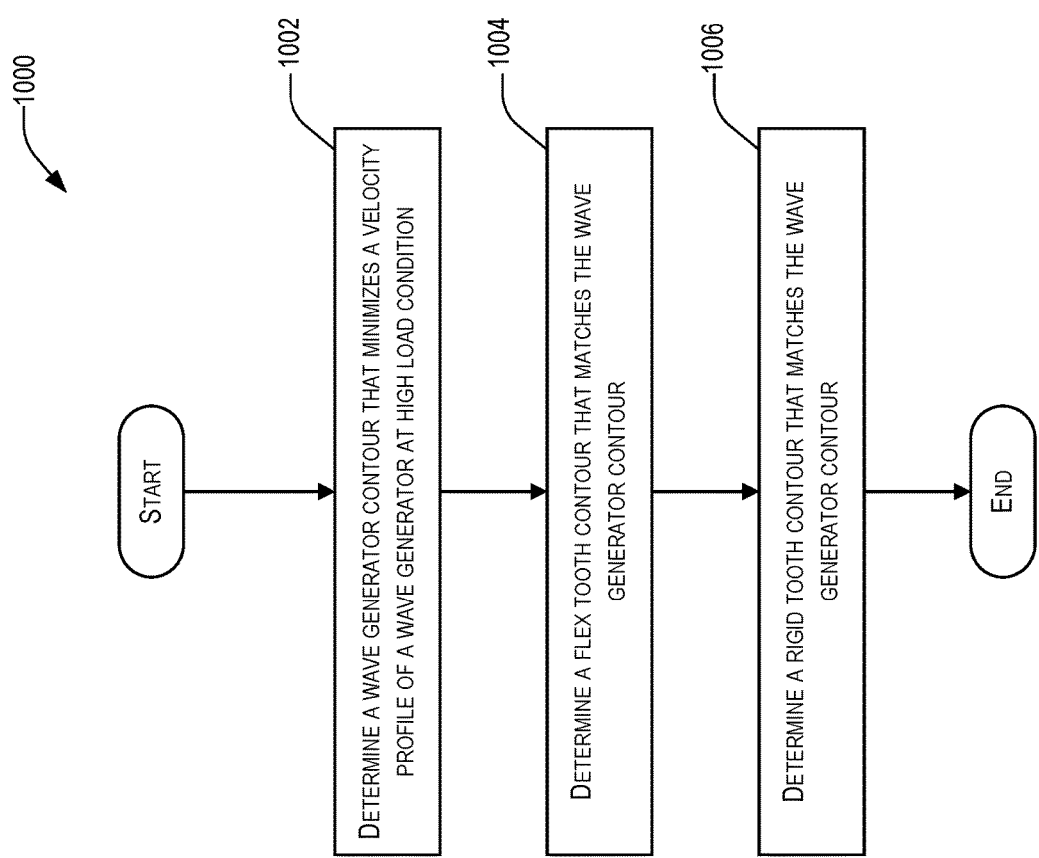
FIG. 10 is a flowchart of an example of an implementation of the method of producing the OHD (shown in FIG. 4) in accordance with the present disclosure.

FIG. 10 shows a flowchart of an example of an implementation of the method 1000 of producing the OHD 400 in accordance with the present disclosure. The method starts by determining, at 1002, the wave generator contour such that the wave generator contour minimizes the velocity profile of the wave generator during a high load condition. The method then includes determining at 1004, a flex spine tooth contour that matches the wave generator contour, where each flex spline tooth of the plurality of flex spline teeth has a flex spline tooth contour that matches the wave generator contour and the flex spline tooth contour also minimizes the velocity profile a combination of the wave generator and the plurality of flex spline teeth during the high load condition. The method then further includes determining, at 1006, a rigid tooth contour that matches the wave generator contour, where each rigid spline tooth of the plurality of rigid spline teeth has the rigid tooth contour that matches the wave generator contour and the rigid tooth contour also minimizes a combination of the wave generator, plurality of flex spline teeth, and the plurality of rigid spline teeth during the high load condition. The method then ends.

In the method 1000, the minimized velocity profile is approximately equal to zero when the plurality of teeth 412 of the flex spline 404 are engaged (i.e., meshed) with the plurality of teeth 414 of the circular rigid spline 406. The wave generator contour 422 is determined by the radius vector 904 that has a parametric relationship with the angle θ 906, where the radius vector 904 is equal to $R_M - H(\sin|\theta| - |\theta|\cos \theta)^x$, where x is greater than 0 and less than 1. Additionally, H is the tooth height 604 of the flex spline tooth 602 of the plurality of flex spline teeth 412, $R_M$ is a length of the semi-major axis 416 of the wave generator 402, and the angle θ 906 is between $$-\frac{\pi}{2} \text{ to } \frac{\pi}{2}.$$

As discussed earlier, H 604 is approximately equal to and less than the tooth width 606 and the tooth width is equal to half of a circumference of the circular rigid spline 406 divided by a first number of teeth. The first number of teeth is equal to the total number of teeth in the plurality of rigid spline teeth 412 and a second number of teeth is equal to the total number of teeth in the plurality of rigid spline teeth 414. In this example, the plurality of rigid spline teeth 414 is greater than the plurality of flex spline teeth 412 so the first number of teeth is greater than the second number of teeth. The reduction ratio is equal to a teeth difference divided by the first number of teeth, where the teeth difference is equal to the second number of teeth minus the first number of teeth. The tooth width 606 is equal to a half of a circumference of the circular rigid spline 406 divided by the first number of teeth and H is approximately equal to and less than the tooth width 606.

In this example, the flex tooth contour is determined by the parametric relationship with an angle φ that is defined as $H(\sin|\varphi| - |\varphi|\cos \varphi)^a$, where a is greater than 0 and less than 1 and φ is between $$-\frac{\pi}{2} \text{ to } \frac{\pi}{2}.$$

Likewise, the rigid tooth contour that matches the wave generator contour is determined by the parametric relationship with an angle φ that is defined as $H(\sin|\phi| - |\phi|\cos \phi)^b$, where b is greater than 0 and less than 1 and φ is between $$-\frac{\pi}{2} \text{ to } \frac{\pi}{2}.$$

In general, the rigid tooth contour is the same as the flex tooth contour and shown general as the tooth contour profile 600 in FIG. 6. It is noted by those of ordinary skill in the art that in these examples the angle variables θ, φ, and φ are the same. Also, the same are exponent variables x, a, and b. The reason for the different notation is to better illustrate the variables that are associated with either the wave generation contour, flex tooth contour, or rigid tooth contour.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

What is claimed is:

1. A harmonic drive comprising:
a wave generator having a wave generator contour;
a flex spline coupled to the wave generator, wherein the flex spline includes a plurality of flex spline teeth; and
a circular rigid spline mechanically engaged to the flex spline, wherein the circular rigid spline includes a plurality of rigid spline teeth,
wherein a number of rigid spline teeth of the plurality of rigid spline teeth is greater than a number of flex spline teeth of the plurality of flex spline teeth and
wherein the wave generator contour is configured so that rotation of the wave generator causes a portion of the flex spline teeth to engage and disengage with tooth cavities formed by a portion of the plurality of rigid spline teeth, wherein the wave generator contour is configured to result in a velocity profile during use with substantially zero velocity for a first tooth of the plurality of flex spline teeth when the first tooth is fully engaged in a tooth cavity formed by a first tooth and a second tooth of the plurality of rigid spline teeth, and wherein the velocity profile corresponds to a movement locus of the first tooth of the plurality of flex spline teeth relative to the tooth cavity.

2. The harmonic drive of claim 1, wherein the first tooth is in a high load condition when fully engaged in any tooth cavity of the tooth cavities.

3. The harmonic drive of claim 2, wherein each flex spline tooth of the plurality of flex spline teeth has a flex tooth contour based on a set of parameters used to generate the wave generator contour.

4. The harmonic drive of claim 1, wherein each rigid spline tooth of the plurality of rigid spline teeth has a rigid tooth contour based on a set of parameters used to generate the wave generator contour.

5. The harmonic drive of claim 1,
wherein the wave generator contour is defined by a radius vector that has a parametric relationship with an angle $\theta$,
wherein the radius vector is equal to $R_M - H(\sin|\theta| - |\theta|\cos \theta)^x$,
wherein x is greater than 0 and less than 1,
wherein H is a tooth height of a flex spline tooth of the plurality of flex spline teeth,
wherein $R_M$ is a length of a semi-major axis of the wave generator, and
wherein $\theta$ is between $$-\frac{\pi}{2} \text{ to } \frac{\pi}{2}.$$

6. The harmonic drive of claim 5, wherein a difference between the length of the semi-major axis of the wave generator and a length of a semi-minor axis of the wave generator is approximately equal to the tooth height.

7. The harmonic drive of claim 1,
wherein a flex tooth contour of the plurality of flex spline teeth is defined by a parametric relationship with an angle $\varphi$ that is defined as $H(\sin|\varphi| - |\varphi|\cos \varphi)^a$,
wherein a is greater than 0 and less than 1,
wherein H is a tooth height of a flex spline tooth of the plurality of flex spline teeth, and
wherein $\varphi$ is between $$-\frac{\pi}{2} \text{ to } \frac{\pi}{2}.$$

8. The harmonic drive of, claim 1,
wherein a rigid tooth contour of the plurality of rigid spline teeth is defined by a parametric relationship with an angle $\phi$ that is defined as $H(\sin|\phi| - |\phi|\cos \phi)^b$,
wherein b is greater than 0 and less than 1,
wherein H is a tooth height of a flex spline tooth of the plurality of flex spline teeth, and
wherein $\phi$ is between $$-\frac{\pi}{2} \text{ to } \frac{\pi}{2}.$$

9. The harmonic drive of claim 8, wherein a flex tooth contour of teeth of the plurality of flex spline teeth is the same as the rigid tooth contour.

10. A method for producing a harmonic drive the method comprising:
coupling a flex spline to a wave generator, wherein the wave generator has a particular wave generator contour, and wherein the flex spline includes a first number of flex spline teeth; and
positioning a first portion of the flex spline teeth in tooth cavities of a circular rigid spline, wherein the tooth cavities are formed between rigid spline teeth of the circular rigid spline, wherein a second number of rigid spline teeth is greater than the first number, wherein the particular wave generator contour is configured so that rotation of the wave generator causes a portion of the flex spline teeth to engage and disengage with the tooth cavities, wherein the particular wave generator contour is configured to result in a velocity profile during use with substantially zero velocity for a first tooth of the flex spline teeth when the first tooth is fully engaged in a tooth cavity formed by a first tooth and a second tooth of the rigid spline teeth, and wherein the velocity profile corresponds to a movement locus of the first tooth of the plurality of flex spline teeth relative to the tooth cavity.

11. The method of claim 10, wherein the first tooth is in a high load condition when fully engaged in any rigid tooth cavity of the rigid tooth cavities.

12. The method of claim 11, further comprising determining the particular wave generator contour,
wherein determining the particular wave generator contour includes determining a radius vector that has a parametric relationship with an angle $\theta$,
wherein the radius vector is equal to $R_M - H(\sin|\theta| - |\theta|\cos \theta)^x$,
wherein x is greater than 0 and less than 1,
wherein H is a tooth height of a flex spline tooth of the flex spline teeth,
wherein $R_M$ is a length a semi-major axis of the wave generator, and wherein θ is between $$-\frac{\pi}{2} \text{ to } \frac{\pi}{2}.$$

13. The method of claim 12, further including determining H, wherein H is approximately equal to a flex spline tooth width.

14. The method of claim 10, further comprising producing a flex tooth contour for the flex spline teeth, wherein the flex tooth contour is based on a set of parameters used to generate the particular wave generator contour.

15. The method of claim 10, further comprising determining a flex tooth contour of the flex spline teeth, wherein determining the flex tooth contour includes determining a parametric relationship with an angle φ that is defined as $H(\sin|\varphi|-|\varphi|\cos \varphi)^a$,
wherein a is greater than 0 and less than 1,
wherein H is a tooth height of a flex spline tooth of the flex spline teeth, and
wherein φ is between $$-\frac{\pi}{2} \text{ to } \frac{\pi}{2}.$$

16. The method of claim 15, further comprising producing a rigid tooth contour for the rigid spline teeth, wherein the rigid tooth contour is based on a set of parameters used to generate the particular wave generator contour.

17. The method of claim 10, further comprising determining a rigid tooth contour of the rigid spline teeth, wherein determining the rigid tooth contour includes determining a parametric relationship with an angle φ that is defined as $H(\sin|\phi|-|\phi|\cos \phi)^b$,
wherein b is greater than 0 and less than 1,
wherein H is a tooth height of a flex spline tooth of the flex spline teeth, and
wherein φ is between $$-\frac{\pi}{2} \text{ to } \frac{\pi}{2}.$$

18. The method of claim 17, wherein a flex tooth contour of the flex spline teeth matches the rigid tooth contour.

19. A method for producing a harmonic drive having a wave generator, the method comprising:
coupling a flex spline to the wave generator, wherein the wave generator has a particular wave generator contour determined based on a set of parameters, wherein the flex spline comprises flex spline teeth, and wherein a flex spline tooth contour of the flex spline teeth is based on the set of parameters of the wave generator; and
positioning a first portion of the flex spline teeth in tooth cavities of a circular rigid spline, wherein the tooth cavities are formed between rigid spline teeth of the circular rigid spline, wherein the particular wave generator contour is configured to result in a velocity profile during use with substantially zero velocity for a first tooth of the flex spline teeth when the first tooth is fully engaged in a tooth cavity formed by a first tooth and a second tooth of the rigid spline teeth, and wherein the velocity profile corresponds to a movement locus of the first tooth of the plurality of flex spline teeth relative to the tooth cavity.

20. The method of claim 19, further comprising coupling the wave generator to a drive shaft and the flex spline to an output shaft.

* * * * *